Figure 1:
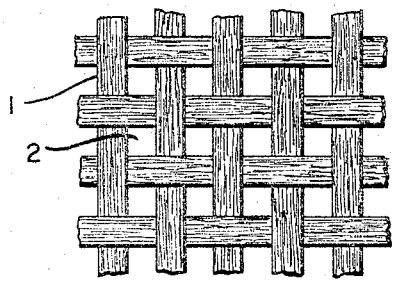
Figure 2:
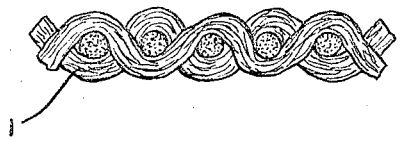

T860,016

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 25, 1969

860 O.G. 1008

618,431

CONVEYOR BELT FABRIC MADE FROM POLY(M-PHENYLENEISOPHTHALAMIDE)

Anton Fridrich Fridrichsen, Nashville, Tenn., assignor to E. I. du Pont de Nemours and Company, Wilmington Del., a corporation of Delaware

Filed Feb. 24, 1967. Published Mar. 25, 1969

Class 117—138.8

1 Sheet Drawing. 10 Pages Specification

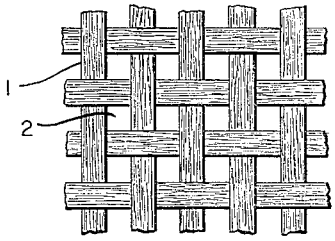

Porous fabric conveyor belts suitable for prolonged use at elevated temperatures are woven from synthetic fibers of aromatic polyamides, and ordered copolymers thereof, polyimides, polyoxadiazoles, polybenzimidazoles and other polymers known to retain desirable properties on prolonged exposure to elevated temperatures. Open area of these fabrics is desirably between 10 and 50%. The fabric is heat set then treated by conventional coating methods with a dispersion of a suitable stabilizing resin such as those comprising aromatic polyamides, polyimides or their polyamideimide precursors, polyoxadiazoles or their precursors, polybenzimidazoles and other similar resins stable to prolonged exposure at elevated temperatures, i.e. over 200° C. The coated fabric is then dried under moderate lengthwise tension at temperatures ranging up to 280° C. and converted to an endless belt by conventional seaming techniques. To prevent sticking of materials to be handled, the thus formed belt is treated in a conventional manner with a fluorocarbon release agent. A preferred fabric for use in such belts is made from poly(m-phenyleneisophthalamide) yarn that has been treated with poly(m-phenyleneisophthalamide) resin.

T860,016
SN - 618431

March 25, 1969 A. F. FRIDRICHSEN DEF. PUB.

CONVEYOR BELT FABRIC MADE FROM POLY(m-PHENYLENEISOPHTHALAMIDE)

Filed Feb. 24, 1967

INVENTOR
ANTON FRIDRICH FRIDRICHSEN

BY Sol Schwartz
ATTORNEY